United States Patent [19]
Barboza et al.

[11] Patent Number: 5,681,469
[45] Date of Patent: Oct. 28, 1997

[54] MELT-BLOWN FILTRATION MEDIA HAVING INTEGRALLY CO-LOCATED SUPPORT AND FILTRATION FIBERS

[75] Inventors: Steven D. Barboza; Charles S. Hoffman, Jr., both of Baltimore, Md.; Clinton V. Kopp, Castle Hill, Australia; Robert J. Schmitt, Stewartstown, Pa.; Anthony C. Shucosky, Timonium, Md.

[73] Assignee: Memtec America Corporation, Timonium, Md.

[21] Appl. No.: 678,415

[22] Filed: Jul. 2, 1996

Related U.S. Application Data

[62] Division of Ser. No. 433,006, May 2, 1995, Pat. No. 5,591,335.

[51] Int. Cl.$^6$ ............................................. B01D 24/00
[52] U.S. Cl. ........................ 210/503; 210/500.1; 210/505; 210/506; 210/508; 210/509
[58] Field of Search .......................... 210/500.1, 503, 210/506, 508, 505, 509, 497.1, 488, 489, 490; 264/113, DIG. 48, 171; 156/167; 55/527, 528, 490; 428/283, 285, 286, 297

[56] References Cited

U.S. PATENT DOCUMENTS

| | | |
|---|---|---|
| 2,565,941 | 9/1951 | Barnard . |
| 3,148,101 | 9/1964 | Allman, Jr. et al. . |
| 3,441,468 | 4/1969 | Siggel et al. . |
| 3,442,751 | 5/1969 | Langlois . |
| 3,543,332 | 12/1970 | Wagner et al. . |
| 3,553,073 | 1/1971 | Rausing et al. . |
| 3,558,411 | 1/1971 | Beelien . |
| 3,616,072 | 10/1971 | Bostrom . |
| 3,684,415 | 8/1972 | Buntin et al. . |
| 3,707,593 | 12/1972 | Fukada et al. . |
| 3,776,796 | 12/1973 | Lipscomb et al. . |
| 3,787,195 | 1/1974 | Kirchheim . |
| 3,787,265 | 1/1974 | McGinnis et al. . |
| 3,801,400 | 4/1974 | Vogt et al. . |
| 3,825,379 | 7/1974 | Lohkamp et al. . |
| 3,865,535 | 2/1975 | Langdon et al. . |
| 3,890,181 | 6/1975 | Stent et al. . |
| 3,904,798 | 9/1975 | Vogt et al. . |
| 3,905,734 | 9/1975 | Blair . |

(List continued on next page.)

FOREIGN PATENT DOCUMENTS 2053791   2/1981   United Kingdom .

OTHER PUBLICATIONS

Memtec America Corporation, Technical Bulletin, No. 1903–T, "Procedures for the Laboratory Determination of Filtration Efficiency", 1991.

"Absolute Efficiency Depth Filter Cartridge Advances", Reprinted from Filtration & Spearation Jan./Feb. 1993.

*Primary Examiner*—Ana Fortuna
*Attorney, Agent, or Firm*—Nixon & Vanderhye PC

[57] ABSTRACT

Filtration medium is formed of a mass of nonwoven melt blown support and filtration fibers which are integrally co-located with one another. The support fibers have, on average, relatively larger diameters as compared to the filtration fibers which are integrally co-located therewith. Preferably, the filtration medium is disposed within at least one annular zone of a filtration element, for example, a disposable cylindrical filter cartridge having an axially elongate central hollow passageway which is surrounded by the filtration media. A depth filter cartridge in accordance with the present invention may thus be formed having one or more additional filtration zones (which additional filtration zones may or may not respectively be provided with integrally co-located support fibers) in annular relationship to one another. As a result of the melt blown, nonwoven fiber structure in accordance with the present invention whereby at least one filtration zone is comprised of relatively larger diameter support fibers integrally co-located with relatively smaller diameter filtration fibers, a filter cartridge having a wide range of "engineered" physical properties (e.g., in terms of filtration, pressure drop tolerance and the like) can be provided.

21 Claims, 11 Drawing Sheets

U.S. PATENT DOCUMENTS

| | | |
|---|---|---|
| 3,905,736 | 9/1975 | Bringman . |
| 3,909,174 | 9/1975 | Blair et al. . |
| 3,933,557 | 1/1976 | Pall . |
| 4,021,281 | 5/1977 | Pall . |
| 4,032,688 | 6/1977 | Pall . |
| 4,091,140 | 5/1978 | Harmon . |
| 4,100,324 | 7/1978 | Anderson et al. . |
| 4,112,159 | 9/1978 | Pall . |
| 4,116,738 | 9/1978 | Pall . |
| 4,188,960 | 2/1980 | Morie et al. . |
| 4,240,864 | 12/1980 | Lin . |
| 4,285,655 | 8/1981 | Matsubara . |
| 4,293,294 | 10/1981 | Rasamussen . |
| 4,353,763 | 10/1982 | Simons . |
| 4,504,454 | 3/1985 | Riggs . |
| 4,595,202 | 6/1986 | Pall et al. . |
| 4,687,579 | 8/1987 | Bergman . |
| 4,714,647 | 12/1987 | Shipp, Jr. et al. . |
| 4,726,901 | 2/1988 | Pall et al. . |
| 4,784,892 | 11/1988 | Storey et al. . |
| 4,861,633 | 8/1989 | Abe . |
| 4,925,601 | 5/1990 | Vogt et al. . |
| 4,988,560 | 1/1991 | Meyer et al. ............................ 428/297 |
| 4,999,080 | 3/1991 | Boich . |
| 5,039,431 | 8/1991 | Johnson et al. . |
| 5,045,094 | 9/1991 | Paranjpe . |
| 5,045,133 | 9/1991 | DaPonte et al. . |
| 5,075,068 | 12/1991 | Milligan et al. . |
| 5,080,702 | 1/1992 | Bosses . |
| 5,141,699 | 8/1992 | Meyer et al. ............................ 264/518 |
| 5,145,689 | 9/1992 | Allen et al. . |
| 5,149,468 | 9/1992 | Hersheiman . |
| 5,190,657 | 3/1993 | Heagle et al. . |
| 5,204,174 | 4/1993 | DaPonte et al. . |
| 5,213,881 | 5/1993 | Timmons et al. . |
| 5,219,633 | 6/1993 | Sabee . |
| 5,223,139 | 6/1993 | Ruger et al. . |
| 5,225,014 | 7/1993 | Ogata et al. . |
| 5,240,530 | 8/1993 | Fink . |
| 5,248,534 | 9/1993 | Rosen . |
| 5,340,479 | 8/1994 | Szcepanski et al. . |
| 5,409,642 | 4/1995 | Allen et al. . |
| 5,454,946 | 10/1995 | Heagle et al. . |
| 5,456,835 | 10/1995 | Castino et al. . |
| 5,456,836 | 10/1995 | Jeffrey et al. ............................ 210/503 |
| 5,503,782 | 4/1996 | Dyrud et al. ............................ 264/115 |

FIG. 4
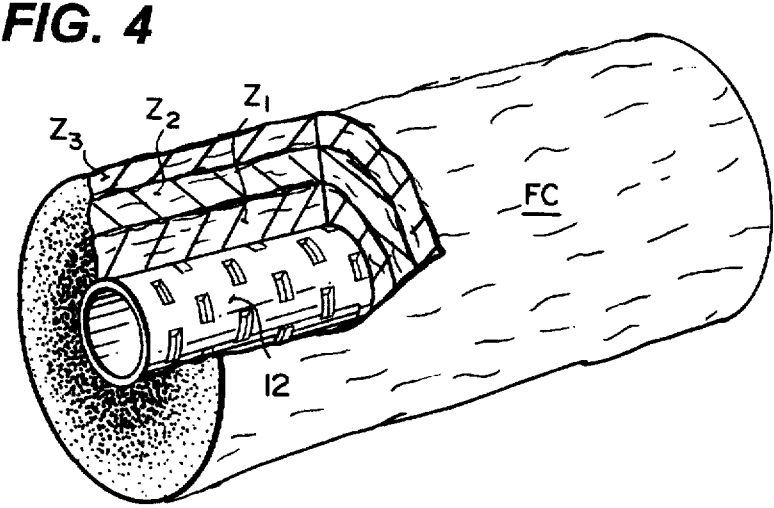
FIG. 2B
FIG. 2A
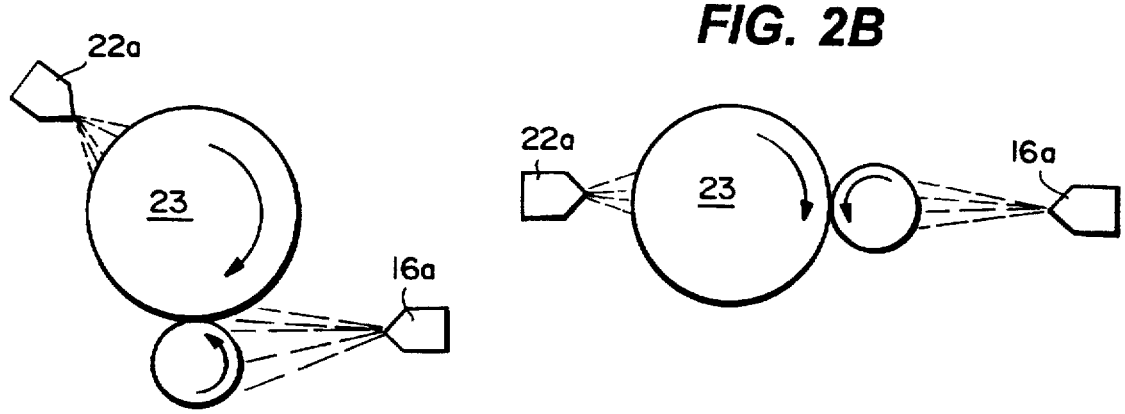
FIG. 3
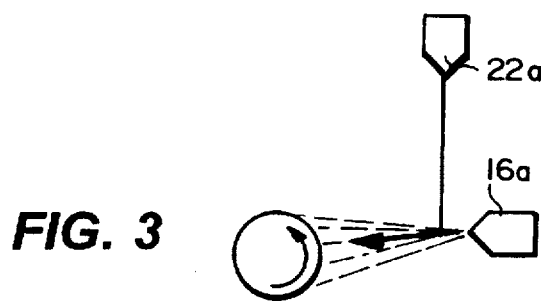

INITIAL PARTICLE REMOVAL EFFICIENCY

PLUGGING

TURBIDIMETRIC EFFICIENCY

MELT-BLOWN FILTRATION MEDIA HAVING INTEGRALLY CO-LOCATED SUPPORT AND FILTRATION FIBERS

This is a division of application Ser. No. 08/433,006, filed May 2, 1995, now U.S. Pat. No. 5,591,335.

FIELD OF INVENTION

The present invention generally relates to the field of fluid filtration. More specifically, the present invention relates to melt blown fluid filtration media. In preferred forms, the filter media is embodied in cylindrical disposable filter cartridges wherein the filter media is disposed in at least one of several annularly adjacent nonwoven, melt blown filtration media layers. In this regard, the annularly adjacent layers may exhibit graded pore sizes/densities so as to achieve a selective fluid filtration efficiency gradient throughout the depth of the filter cartridge (i.e., so-called "depth filter cartridges").

BACKGROUND OF THE INVENTION

Depth filter cartridges formed of a nonwoven mass of a melt blown polymer are well known and have achieved widespread use in fluid filtration applications. Typically, such melt blown filter cartridges are made by extruding a polymer through orifices associated with a melt blowing die to form fibers which are directed toward a rotating forming mandrel. During melt blowing, a flow of inert gas (e.g., air) acts on the molten fibers so as to attenuate the fibers to relatively fine diameter and to randomly distribute the attenuated fibers onto the forming mandrel. Over time, therefore, a mass of nonwoven, randomly intermingled solidified fibers builds up on the forming mandrel. Controlled axial movement of the built-up mass of melt blown fibers relative to the melt blowing die will therefore allow a cylindrical filter cartridge of indefinite length to be formed continuously.

During melt blowing, it is well known that one or more of the process conditions associated with the melt blowing die may be varied so as to responsively achieve varied attributes of the resulting melt blown fibers in terms of fiber diameter and/or density, and thereby pore size. For example, in U.S. Pat. Nos. 3,904,798 and 3,801,400 (the entire content of each being incorporated expressly hereinto by reference), there is disclosed a technique whereby the (i) temperature of the polymer, (ii) speed of polymer extrusion, (iii) speed of rotation of the forming mandrel, (iv) distance between the melt blowing die and forming mandrel, and/or (v) weight of an idler roll associated with the forming mandrel, may be changed so as to gradually change the density of a melt blown fiber layer relative to a previously melt blown adjacent layer.

U.S. Pat. Nos. 4,594,202 and 4,726,901 (the entire content of each being incorporated expressly hereinto by reference) disclose a technique whereby the fiber diameter of the melt blown fibers is controllably varied to achieve substantially constant voids volume for each level of fiber diameter variance throughout the radial dimension (depth) of the filter cartridge without substantial fiber-to-fiber bonding.

In use, a filter cartridge must be capable of withstanding a significant pressure drop across its radial thickness (which pressure drop increases with increasing entrapment of particulates removed from the filtered fluid). In order to permit the filter cartridge to withstand pressure drops within design limits without collapse of the filter medium, it has been conventional practice to include a separate perforated tubular core around which the filter medium is disposed. (Please see in this regard, U.S. Pat. Nos. 3,933,557, 4,032,688 and 4,112,159, the entire content of each being expressly incorporated hereinto by reference).

It has also been proposed in the art to form "coreless" depth filter cartridges which include a nonwoven mass of melt blown fibers. For example, U.S. Pat. No. 4,240,864 (the entire content of which is incorporated herein expressly by reference) discloses a technique whereby a coreless melt blown filter cartridge may be made by varying the pressure applied to the accumulating fibers on the forming mandrel so as to obtain a filter of varying media density. Thus, although the diameters of the fibers in the various layers is substantially constant, by varying the pressure on such accumulated fibers from one zone to the next, a filter cartridge may be made having an innermost zone of sufficiently high density to serve as an integral "core".

More recently, U.S. Pat. No. 5,340,479 (the entire content of which is incorporated expressly hereinto by reference) has disclosed a depth filter cartridge formed of melt blown fibers having support filaments at a central area of the filter with diameters sufficiently large to thermally bind into a structure which is strong enough to support the remainder of the filter structure without collapse. This zone of relatively large diameter fibers thereby serves as an integral "core" for the remaining surrounding relatively small diameter filtration fibers.

While the above-described filter cartridges possess certain beneficial attributes, some improvements are still needed. For example, it would especially be desirable if a melt blown, nonwoven filter cartridge could be provided whereby one or more of the annular filtration zones was provided with integral support structure. It would furthermore be desirable if such integral support structure was in the form of continuously produced melt blown support fibers which are integrally co-located (i.e., intermingled) with concurrently melt blown filtration fibers within one or more of the annular filtration zones so that the filtration characteristics and pressure drop limits could be selectively "engineered" to meet specific end-use applications. It is towards fulfilling such a need that the present invention is directed.

SUMMARY OF THE INVENTION

Broadly, the present invention is embodied in filtration media formed of a mass of nonwoven melt blown support and filtration fibers which are integrally co-located with one another. The support fibers have, on average, relatively larger diameters as compared to the filtration fibers which are integrally co-located therewith. In preferred embodiments, the filtration media is disposed within at least one annular zone of a filtration element, for example, a disposable cylindrical filter cartridge having an axially elongate central hollow passageway which is surrounded by the filtration media.

The cylindrical filter cartridge according to the present invention will thus preferably include at least one annular filtration zone surrounding a central axially elongate hollow passageway and will integrally be formed of the co-located relatively larger diameter support fibers and relatively smaller diameter filtration fibers. A depth filter cartridge in accordance with the present invention may therefore be formed having one or more additional filtration zones (which additional filtration zones may or may not respectively be provided with integrally co-located support fibers) in annular relationship to one another. As a result of the melt blown, nonwoven fiber structure in accordance with the present invention whereby at least one filtration zone is comprised of relatively larger diameter support fibers integrally co-located with relatively smaller diameter filtration fibers, a filter cartridge having a wide range of "engineered" physical properties (e.g., in terms of filtration, pressure drop tolerance and the like) can be provided.

Further aspects and advantages of this invention will become more clear after careful consideration is given to the following detailed description of the preferred exemplary embodiments thereof.

BRIEF DESCRIPTION OF THE DRAWINGS

Reference will hereinafter be made to the accompanying drawings wherein like reference numerals throughout the various FIGURES denote like structural elements, and wherein;

FIG. 2A is a schematic end view of the melt blowing system shown in FIG. 1;

FIG. 2B is a schematic end view of an alternative melt blowing system that may be used in accordance with this invention;

FIG. 3 is a schematic end view of an alternative melt blowing system to produce the filter cartridges of this invention;

FIG. 4 is a schematic perspective view, partly in section, showing an exemplary cylindrical filter cartridge in accordance with the present invention;

DETAILED DESCRIPTION OF THE PREFERRED EXEMPLARY EMBODIMENTS

Figure 1:
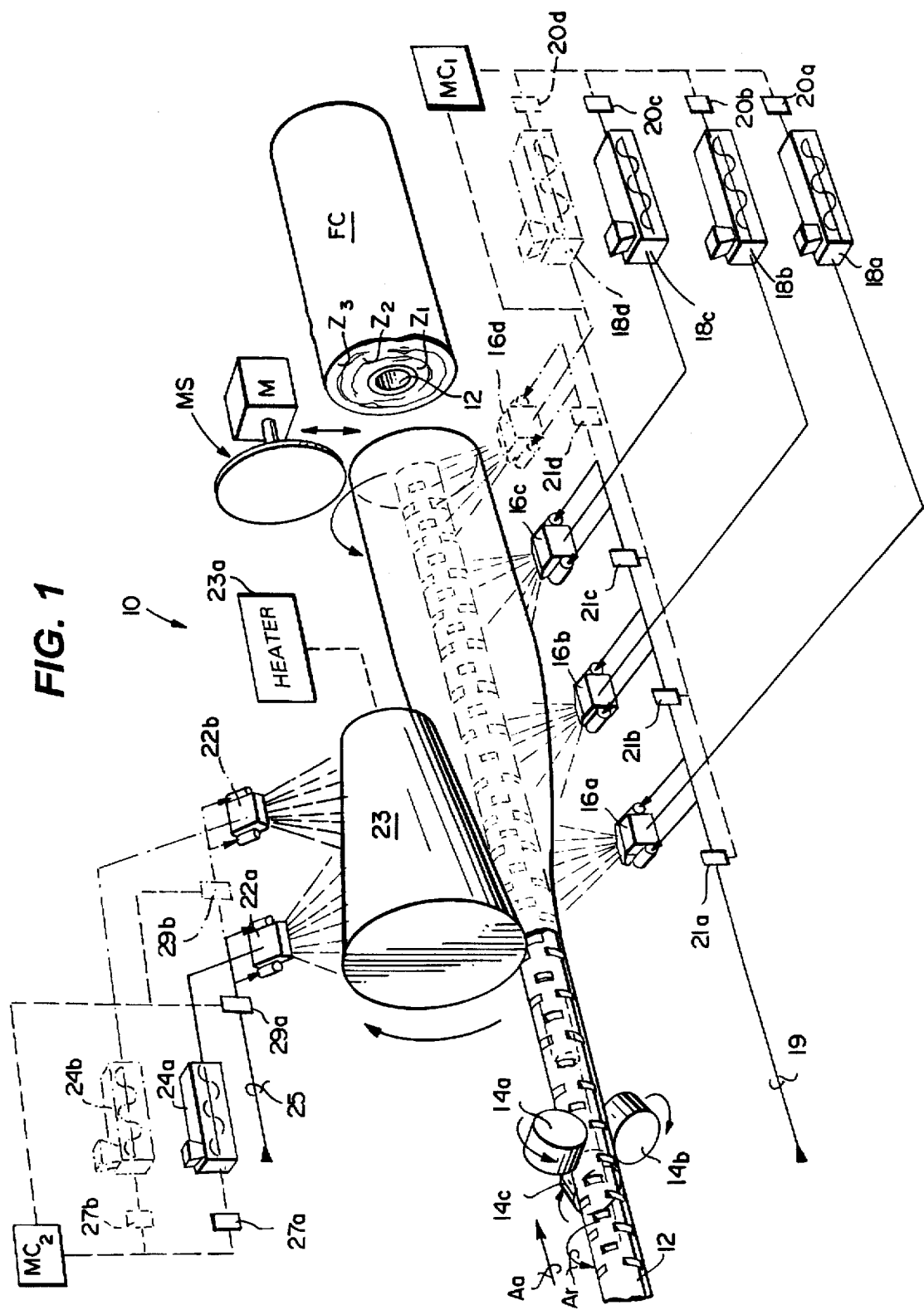
FIG. 1 is a schematic perspective view showing one preferred melt blowing system for producing the filter cartridges of this invention.

One form of an apparatus 10 which is especially adapted to produce a depth filter cartridge FC in accordance with the present invention is depicted schematically in accompanying FIG. 1. As is seen, the apparatus 10 generally includes a forming mandrel composed of a length of a perforated tube 12 (which will ultimately form the core of the filter cartridge FC) supported for axial and rotational movements (arrows $A_a$ and $A_r$, respectively) by means of skewed drive rollers 14a–14c. Although not shown, another set of rollers 14a–14c is employed downstream, but contact the exterior surface of the filter media on the tube 12. A bank of melt blowing dies 16a–16c fed by a respective extruder 18a–18c is aligned parallel to the axial movement (arrow $A_a$) of the perforated tube 12 so as to sequentially melt blow continuous filtration fibers toward the perforated tube 12 and thereby respectively create at least three annular zones $Z_1$–$Z_3$ of the filter cartridge FC (see also, FIG. 4).

The melt blowing dies 16a–16c are, in and of themselves conventional, in that they are each supplied with a flow of pressurized fluid (e.g., pressurized air) via line 19 which acts upon the fiber melt streams discharged from the respective dies so as to attenuate the individual fibers and propel them toward the perforated tube 12. The extruders 18a–18c and/or air streams associated with the respective dies 16a–16c may, however be individually controlled by metering pumps 20a–20c and flow controllers 21a–21c which are operatively coupled to master controller $MC_1$. Thus, the extruders may be controlled as to temperature, polymer flow rate and the like, while the air stream may be controlled as to pressure, flow rate and the like so that any number of processing conditions may be selected to obtain melt blown fibers of desired diameter. These processing conditions may be preset by an operator in the master controller $MC_1$ in dependence upon the desired filter cartridge FC to be manufactured so that the various annular zones $Z_1$–$Z_3$ may be manufactured automatically.

The axial movement of the perforated tube (and hence the melt blown fibers which respectively accumulate in annular zones $Z_1$–$Z_3$ by virtue of the operation of melt blowing dies 16a–16c) is controlled by the rotation speed and angle of the skewed drive rollers 14a–14c. Ultimately, however, a tubular section formed of accumulated melt blown fibers from dies 16a–16c of indefinite, but predetermined, length will extend axially beyond the bank of dies 16a–16c. A conventional cutting apparatus (e.g., a motorized saw MS which may be mounted for reciprocal movements) may then be operated manually or automatically, so as to sever the extended length and thereby form a filter cartridge FC. In such a manner, the apparatus 10 shown in FIG. 1 sequentially forms filter cartridges FC on a continuous basis. The filter cartridges FC may then be further severed to finished length in a subsequent sizing process (not shown).

Important to the present invention, the apparatus 10 is provided with at least one additional melt blowing die 22a which is disposed in radially spaced relationship to a conically shaped collection/transfer roller 28. Like the dies 16a–16c, the die 22a is of conventional design in that it discharges a plurality of polymer fiber melt streams which are acted upon by a stream of pressurized fluid (e.g., air) supplied to the die 22a via line 25. The operation of the extruder 24a which feeds the die 22a with a melt flow of polymer may be controlled together with the fluid stream associated with the die 22a via controllers 27a and 29a, respectively, so as to obtain continuous support fibers having a relatively larger diameter as compared to the diameter of the filtration fibers formed by die 16a. The controllers 27a, 29a may be operatively connected to a master controller $MC_2$ so that an operator may input the requisite processing set points to achieve the desired diameter support fibers.

The die 22a is positioned relative to the collection/transfer roller 23 in such a manner that the attenuated support fibers issuing therefrom impinge upon the rotating exterior surface of the roller 23 and are carried thereby so as to be presented to the stream of filtration fibers issuing from the dies 16a and/or 16b and transferred to the surface of the forming filter cartridge as schematically shown in FIG. 2A. By positioning the die 22a in the manner shown in FIG. 2A, therefore, the support fiber streams issuing therefrom will substantially be unaffected by the attenuating air flow associated with the filtration fiber streams issuing from dies 16a and/or 16b, and vice versa. In other words, the fiber streams and their associated attenuating air flows issuing from the die 22a on the one hand, and dies 16a, 16b on the other hand, are mutually blocked or "hidden" from one another by virtue of the collection/transfer roller 23 being interposed between the dies 22a and 16a, 16b so that proper process control can be exercised over the respective streams.

An alternative arrangement of the dies 22a and 16a is shown schematically in accompanying FIG. 2B. As seen, the dies 22a and 16a are positioned substantially in the same plane as, but on opposite sides of, the collection/transfer roller 23—i.e., the dies 22a and 16a are axially aligned in opposed relationship to one another. In such an arrangement, the roller 23 will beneficially serve to prevent disruption of the fiber stream issuing from the die 16a by the fiber stream issuing from die 23a by virtue of its flow-blocking positioning as described above with reference to FIG. 2A. Therefore, according to the present invention, the die 22a may be angularly oriented between about 0° to about 90° relative to a horizontal plane passing through the correction/transfer roller 23. When the embodiment depicted in FIG. 2A is employed, the die 22a is most preferably oriented about 45° relative to a horizontal plane passing through the collection/transfer roller 23.

The fibers issuing from die 22a will be at an elevated temperature so that the support fibers are maintained in a sufficiently molten state throughout the rotation segment of the roller 23 until they are presented to the stream of filtration fibers issuing from the dies 16a and/or 16b. In such a manner, therefore, the support fibers are presented in a sufficiently molten state to the filtration fiber streams issuing from dies 16a and/or 16b so that at least some of the support and filtration fibers melt bond with one another at their crossing points. That is, since the support fibers are maintained in a sufficiently softened or molten state, the impact of the filtration fibers at the nip area between the roller 23 and the filter cartridge then being formed will cause at least some of the support and filtration fibers to be melt bonded with one another at their respective crossing points to such an extent that such support and filtration fibers unitarily fuse upon cooling. This fusion of at least some of the support and filtration fibers is highly beneficial since it is believed to contribute to filter cartridges having improved capabilities to withstand significant pressure drops across their radial thickness. If desired, the collection/transfer roller 23 may be heated by external means, for example, by means of an electrical resistance heater and/or heated fluid (e.g., heated air) passed to the roller 23 as depicted schematically by heater 23a in FIG. 1 so as to obtain the desired at least partially molten characteristics of the support fibers when presented to the filtration fibers.

The support fiber die 22a may alternatively be positioned relative to the filtration fiber die 16a in the manner depicted in FIG. 3. As shown, the support fiber die 22a may be positioned in such a manner that the support fibers issued therefrom become entrained with the stream of filtration fibers issued from die 16a. In this alternative die arrangement, die 22a are most preferably positioned substantially 90° relative to the die 16a, but is located downstream thereof. In such a manner, the support fibers issuing from dies 22a become entrained and intimately entangled with the filtration fibers issuing from die 16a so as to form a nonwoven entangled mass comprised of both the support and filtration fibers upon striking the filter cartridge being formed. In this case also, the support and filtration fibers will be thermally bonded to some extent as described above with reference to FIGS. 2A and 2B.

An exemplary depth filter cartridge FC formed with the apparatus described above with reference to FIGS. 1–3, is shown in accompanying FIG. 4. The filter cartridge FC depicted in FIG. 4 includes three annular filtration zones $Z_1$–$Z_3$ surrounding the central perforated tube 12 since three dies 16a–16c were employed in the apparatus 10. However, more or less than three dies 16a–16c may be employed in dependence upon the particular filter cartridge design parameters. Thus, an additional die 16d and its associated extruder 18d and controllers 20d, 21d may be provided downstream of die 16c so as to form a forth annular filtration zone. The use of only one or two of the dies—for example, dies 16a and/or 16b and their associated respective extruders 18a and 18b—may likewise be practiced so as to form a filter cartridge having only one or two corresponding annular zones.

Similarly, one or more other dies (e.g., die 22b and its associated extruder 24b and controllers 27b, 29b as shown in FIG. 1) may be provided in radially spaced relationship to one or more of the dies 16b–16c (and die 16d, if present) so that other annular zones may be provided with relatively large diameter support fibers in a manner similar to that provided by die 22a and its associated extruder 24a. These additional dies 22b may likewise be provided so as to co-locate non-supporting fibers of, for example, a different polymer, so as to achieve a mix of fibers in one or more of the annular zones $Z_1$, $Z_2$ and/or $Z_3$. The die 22b may, however, be fed from the same extruder 24a as die 22a so that support fibers of the same polymer are formed. In any case, the processing conditions of die 22a and/or 22b may be selected so that support fibers of different relative diameters are formed. Thus, for example, die 22b may be employed so as to form support fibers having an intermediate diameter as compared to the support fibers formed by die 22a and the filtration fibers formed by die 16a.

It will be understood that only one of the dies 22a and 16a are depicted in FIGS. 2A, 2B and 3, but that the discussion above with regard to such FIGURES is equally applicable to the relative orientations of dies 22b and 16b–16d as well.

In the apparatus 10 discussed above, it is the innermost annular zone $Z_1$ which is provided with relatively large diameter support fibers and relatively small diameter filtration fibers due to the operation of dies 16a and 22a, respectively. However, as also noted above, one or more of the other zones $Z_2$–$Z_3$ may also be provided with such relatively large diameter support fibers. A schematic representation of the fibrous structure forming exemplary zone $Z_1$ is shown in accompanying FIG. 5.

The relatively small diameter filtration fibers 30 and the relatively large diameter support fibers 32 are integrally co-located within zone $Z_1$—that is to say, the filtration fibers 30 and support fibers 32 are melt blown by their respective dies 16a and 22a so as to impinge on the central tube 12 in such a way to become commingled with one another. Thus, by the term "integrally co-located" as employed in the specification and the accompanying claims, there is meant to convey that the relatively smaller diameter filtration fibers 30 and the relatively large diameter support fibers 32 are intimately entangled with one another. The relatively small diameter filtration fibers and large diameter support fibers may also be thermally bonded to some extent. That is, as described briefly above, at least some of the filtration fibers may be thermally fused to at least some of the support fibers at their respective crossing points.

Figure 5:
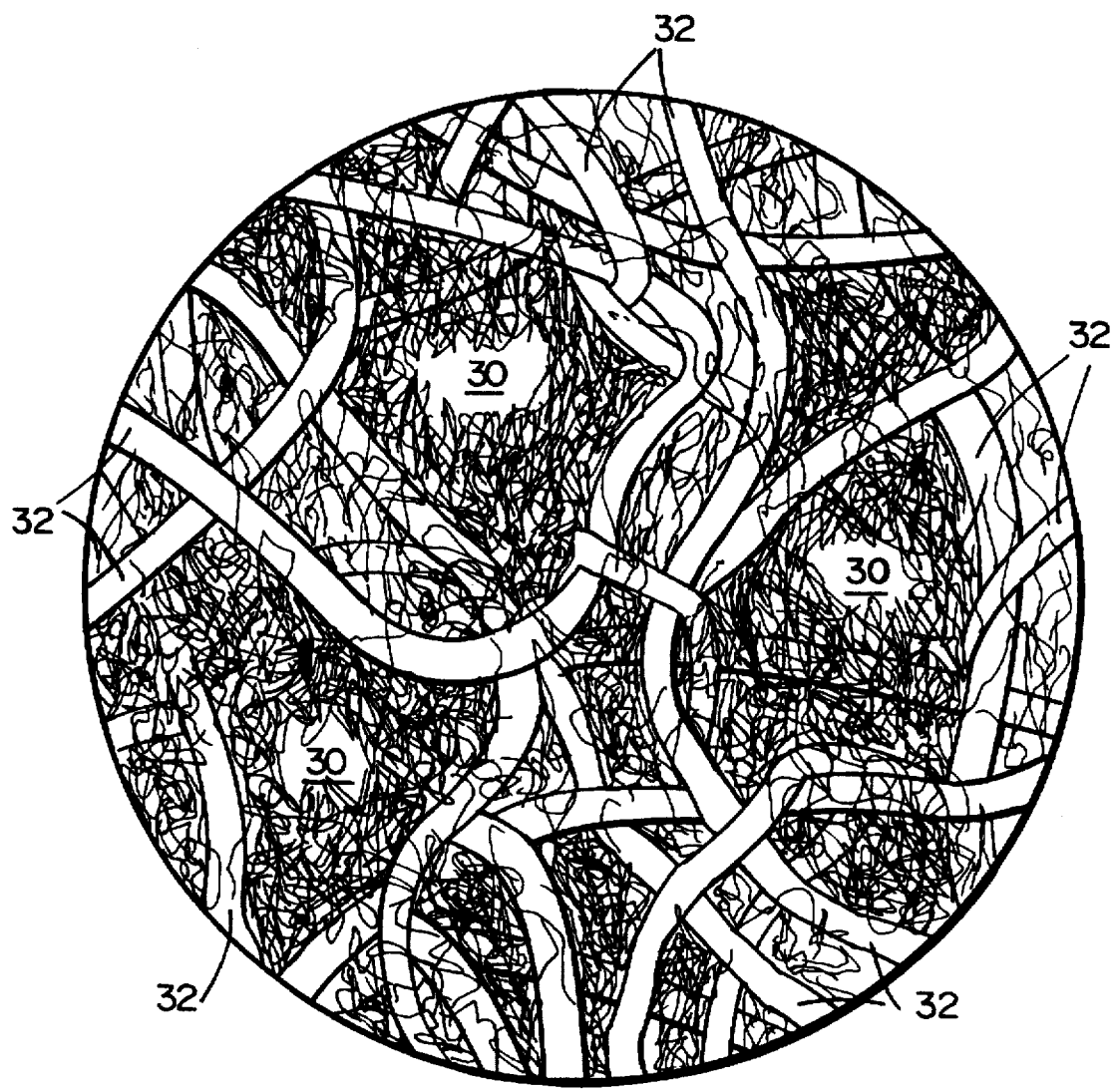
FIG. 5 is a schematic representation showing the structural relationship between the co-located support fibers and filtration fibers in accordance with the present invention.

As is seen in FIG. 5, the relatively large diameter support fibers 32 form a random matrix of open areas or void spaces occupied by a tangled mass of filtration fibers 30. Thus, this random matrix of void spaces which is defined by the support fibers 32 provides a network structure for supporting the filtration fibers 30. It is surmised that the support fibers 32 do not contribute substantially to the filtration properties of the filtration cartridge. Instead, the overall filtration efficiency is believed to be determined substantially by the mass of filtration fibers 30 which occupy the void spaces of the supporting fiber network. The supporting fibers, however, are believed to contribute substantially to supporting the filtration fibers 30 against collapse due to increased pressures so that their filtration effectiveness may be prolonged in use.

Preferably, the relatively smaller diameter filtration fibers will have a mean diameter of between about 1 µm to about 50 µm, and more preferably between about 1 µm to about 40 µm. The relatively larger diameter support fibers will preferably have a mean diameter of between about 60 µm to about 500 µm, and more preferably between about 80 µm to about 300 µm. The filtration fiber diameters noted above are the mean diameters within individual annular zones of the filtration cartridge. Filter cartridge zones having mean filtration fiber diameters greater than about 20 µm may not require the presence of the support fibers. If present in the filter cartridge zone, however, the relatively larger diameter support fibers will preferably comprise between about 10 to about 60 wt. %, more preferably between about 20 to about 50 wt. %, of the fibers which constitute the filtration zone in which such support fibers are employed.

Virtually any polymer which is capable of being melt blown may be used to form the filter cartridges FC according to this invention. Such polymers may, for example, be polyolefins (e.g., polymers and copolymers of polyethylene, polypropylene and the like), polyamides (e.g., nylon-6, nylon-6,6 and other nylons), polyesters (e.g., polyethylene terephthalate, polybutylene terephthalate, polycyclohexylene dimethylene terephthalate and the like), acetals, fluoropolymers ( e.g., ethylene-chlorotrifluoro-ethylene ), polyphenylene sulfide, biodegradable polymers (e.g., poly (lactide)), liquid crystal polymers, recycled polymers, polyetheretherketone (PEEK), polystyrenes, polymers of vinylidene monomers such as vinyl chloride, vinyl acetate, vinylidene chloride, and acrylonitrile), and mixtures thereof. Particularly, preferred are the polyolefins, polyesters and nylons.

The individual zones $Z_1$–$Z_3$ may be comprised of filtration fibers formed of the same polymer, or may be formed of different polymers in order to achieve the filter cartridge designer's goal for particular end-use applications. Similarly, the filtration fibers 30 and support fibers 32 may be formed of the same or different polymer or may be formed of different melt flow indices of the same polymer as may be desired.

A further understanding of this invention will be gained by reference to the following non-limiting examples.

EXAMPLES

A. General Information

In the following examples, a number of filter cartridges identified as Invention Cartridges IC1 through IC6 were fabricated using an apparatus of the type essentially as shown in FIG. 3, but modified in the manner described below. The filtration fibers were generated from three conventional 6-inch wide melt blowing dies, each containing 88 polymer orifices 0.015 inch in diameter and adjustable air gaps. The dies were aligned parallel to the support core of the filter cartridge, as shown in FIG. 1, to thereby form filter cartridges containing three annular zones of filtration media. The filtration fiber die air gap settings were 0.025, 0.030 and 0.035 inch at the inner, middle and outer zone dies, respectively.

Each die was supplied molten polymer from an independently driven metering pump. Each metering pump was fed by a ¾ inch diameter, 24/1 L/D extruder (Killion Extruders, Inc., Model KLB075). Heated compressed air was also supplied to the three dies to attenuate the fibers and propel them toward the support core. Different air temperatures were employed in the examples. However, in each example, the air temperature was the same at each of the three dies. The process variables of air flow rate, polymer temperature and polymer flow rate were selected for each die to produce filtration fibers of the desired diameter in the corresponding filter media zones. The distance from the face of the dies to the support core (i.e., the distance over which the filtration fibers were attenuated and conveyed by the air streams) was held constant at 16-inches in all of the examples.

The support fibers were generated from a single 1-inch diameter, 24/1 L/D extruder (Rainville Company) fitted with an appropriate fiber forming die. Two different die designs, described below, were employed for support fiber formation. The extruder was mounted on a moveable base with height and angular adjustments which provided considerable flexibility in the position of the die relative to the filtration fiber streams and the cartridge. Various die positions were employed in the examples as described below. In all examples, the support fiber die was positioned such that the support fibers were discharged directly into the filtration fiber streams, between the filtration fiber dies and the cartridge. The support fiber die was angled approximately 90° to the filtration fiber streams and was elevated an estimated distance of about 9-inches above the filtration fiber streams. The support fiber die was also positioned such that the support fibers entered the filtration fiber streams close to the outlet of the filtration fiber dies (i.e., spaced downstream of the filtration fiber dies by about 2 inches). Compressed heated air was supplied to the support fiber die from the same source which supplied the filtration fiber dies, therefore the support fiber die was operated at the same air temperature as the filtration fiber dies. The air discharged from the support fiber die served to both attenuate the support fibers and to convey these fibers into the filtration fiber streams. The support fibers were then blown to the cartridge by the filtration fiber air streams. The process variables of air flow rate, polymer temperature and polymer flow rate were selected to obtain support fibers of the desired diameter.

Both the support and filtration fibers were collected on the perforated support tube which was rotated at a typical speed of about 250 RPM and translated axially at a typical rate of about 19 inches per minute. These speeds were adjusted, as necessary, during operation to maintain a generally uniform cartridge outside diameter.

Unless otherwise noted, both the filtration and support fibers in the following examples were formed from a polypropylene homopolymer material having a melt flow rate, as supplied, of 38 g/10 min. and a density of 0.904 g/cm$^3$ (Amoco Chemical Company, Grade 7956). The perforated support tube utilized was an industry standard injected molded polypropylene filter core having diameters of 1.31 inches O.D.×1.09 inches I.D. The dimensions of the example cartridges were 2.44 inches O.D.×1.09 inches I.D.× 10 inches long.

The Mean Medium Void Volume and Air Permeabilities for Invention Cartridges IC1 through IC6 were determined as follows:

Mean Medium Void Volume: The average void volume of the filter medium in a cartridge expressed as a percentage. This property was determined by measuring the dimensions (inside diameter, outside diameter and length) and weight of a sample of filter medium and calculating the density of the sample. The mean void volume was then calculated as follows:

$$\text{Mean Medium Void Volume} = \frac{D_r - D_m}{D_r} (100)$$

where, $D_r$ is the density of the resin (=0.904 g/cm$^3$), and $D_m$ is the density of the medium.

Air Permeability: The air permeability of a complete, unused filter cartridge expressed in units of pressure differential at a specified air flow rate. This property was determined by flowing compressed air through a cartridge at a rate of 2 SCFM/10" cartridge and simultaneously measuring the pressure differential ($\Delta P$ in inches of water) across the cartridge. The direction of flow was inside out, i.e., through the perforated support tube first and then through the filter medium.

The Mean Medium Void Volume, Air Permeability, and other physical attributes of Invention Cartridges IC1 through IC6 appear in the Physical Data Table below.

B. Filter Cartridge Performance Testing:

The filtration performance of the example cartridges was evaluated using the procedures described in Memtec America Corporation Technical Bulletin No. 1903-T (1991) (the entire contents of which are expressly incorporated hereinto by reference). The test samples were then analyzed to obtain the properties and data noted below:

Initial Particle Removal Efficiency: The initial particle removal efficiency of each test filter cartridge was determined based on particle size analysis of the inlet and outlet fluid samples. The sizes and numbers of particles were measured using an electronic particle counter (Coulter Electronics, Inc. Model TAII). The efficiency was expressed in terms of beta ratio and was calculated as follows:

$$\beta_x = \frac{I_x}{O_x}$$

where:
x=particle size in micrometers (μm);
$\beta_x$=Beta Ratio at particle size x;
$I_x$=number of particles of size x in inlet sample; and
$O_x$=number of particles of size x in outlet sample.

The initial particle removal efficiency was presented graphically as a plot of the beta ratio vs. particle size.

Plugging Data: The plugging performance of each cartridge was evaluated by monitoring the differential pressure ($\Delta P$) across the cartridge and recording the result every 20 minutes. The plugging data are shown graphically as a plot of $\Delta P$ vs. run time.

Turbidimetric Efficiency: The turbidimetric efficiency of each cartridge was determined every 20 minutes based on turbidity measurements of the inlet and outlet fluid samples. The turbidity of the samples was measured using a conventional turbidimeter (Hach Chemical company, Model 2100A) in nephelometric turbidity units (NTU). The turbidimetric efficiency was calculated, every 20 minutes as follows:

$$\% \text{ Turbidimetric Efficiency} = \frac{T_i - T_o}{T_i} (100)$$

where:
$T_i$ is the inlet turbidity; and
$T_o$ is the outlet turbidity.

The turbidimetric efficiency results were then plotted vs. run time.

Example 1

For this Example 1, the support fiber die included a bank of nine nozzles with each nozzle similar in design to the type disclosed in U.S. Pat. No. 3,543,332 (incorporated hereinto fully by reference). Each nozzle contained a single 0.035 inch diameter polymer orifice and three 0.083 inch diameter air holes. The nine nozzles were aligned parallel to the axis of the cartridge and were spaced over a distance of 18 inches. The support fiber die was positioned such that support fibers were discharged into the full width of the filtration fiber streams to achieve a mixture of support and filtration fibers in each annular zone of the cartridge. A system air temperature of 550° F. was utilized. The process conditions at each die to produce a cartridge in accordance with the present invention (Invention Cartridge 1, designated IC1) were as follows:

|  | Polymer Temp. (°F.) | Air Flow Rate (SCFM) | Polymer Flow Rate (g/min) |
|---|---|---|---|
| Filtration Fiber Dies: | | | |
| 1. Inner Zone | 500 | 76 | 22.3 |
| 2. Middle Zone | 550 | 68 | 27.4 |
| 3. Outer Zone | 550 | 62 | 48.8 |
| Support Fiber Die | 500 | 11 | 78.0 |

Figure 6A:
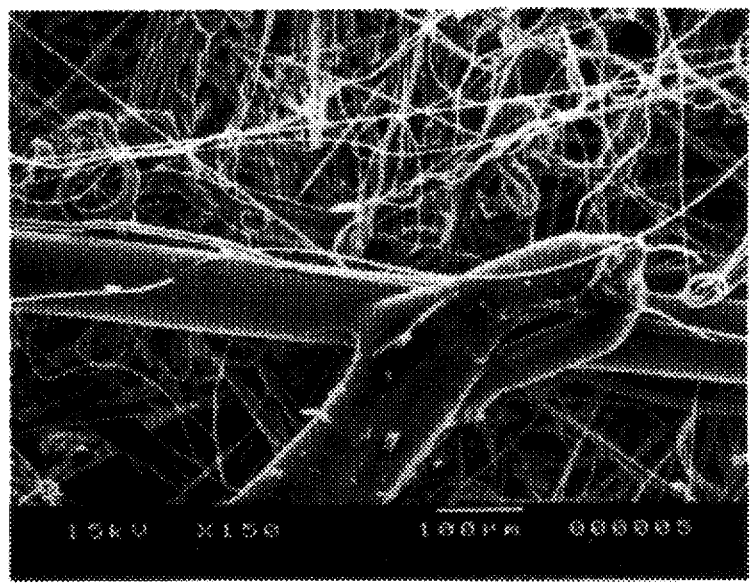
FIGS. 6A–6F are each photomicrographs of representative portions of Invention Cartridges IC1 through IC6 obtained in the following Examples showing the structural relationship between the melt blown, integrally co-located support fibers and filtration fibers.
Figure 7A:
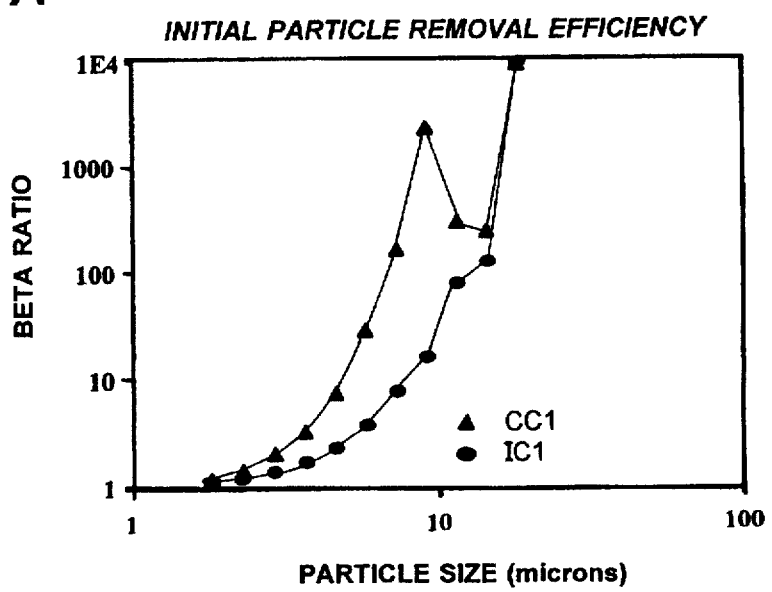
FIGS. 7A–7C are graphs corresponding respectively to the initial particle removal efficiency, plugging data and turbidimetric efficiency for the filter cartridges tested according to Example 1.
Figure 7B:
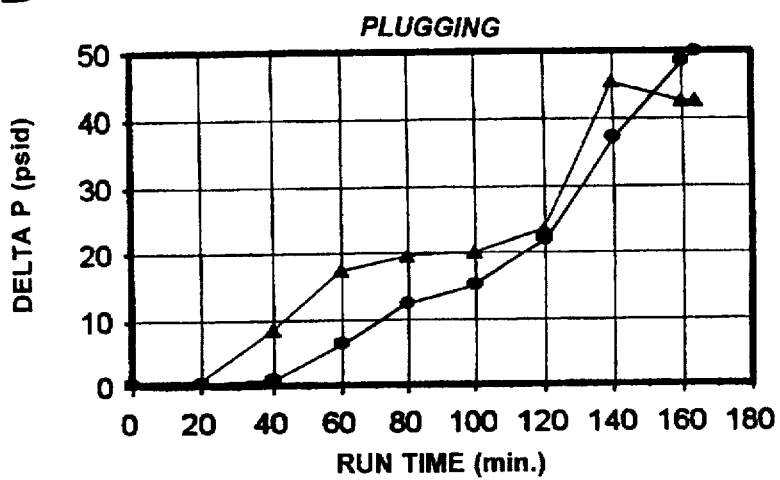
Figure 7C:
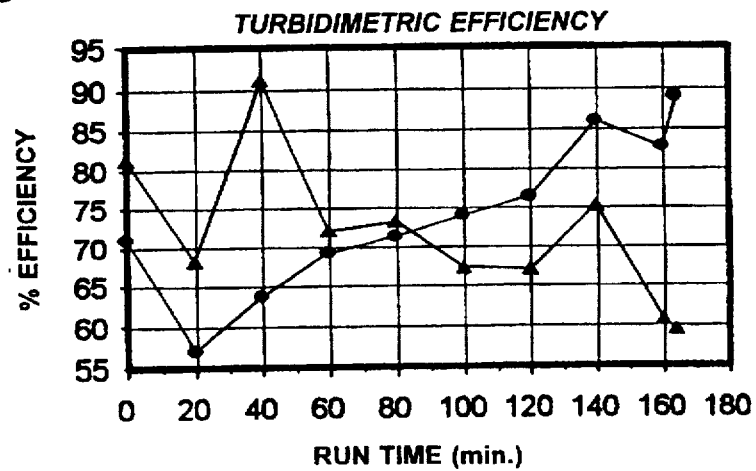

To evaluate the effect of the support fibers, a cartridge which was formed entirely of filtration fibers (Control Cartridge 1 designated "CC1")was fabricated under the above conditions except with the support fiber die inoperative. The two cartridges were then performance tested, side by side, under the same test conditions. The results of such testing appear in the graphs of FIGS. 7A–7C, while a photomicrograph of the fibrous structure of IC1 is shown in FIG. 6A.

Example 2

The support fiber die for this Example 2 was a conventional 6-inch wide melt blowing die with twelve (12) 0.015 inch diameter polymer orifices and an air gap setting of 0.050 inch. The support fiber die was positioned such that support fibers were collected mainly in the inner zone and a small portion in the middle zone of the filter media. The air temperature was 500° F. The process utilized at each die to produce a cartridge according to the present invention (Invention Cartridge 2 designated "IC2") are shown below:

| | Polymer Temp. (°F.) | Air Flow Rate (SCFM) | Polymer Flow Rate (g/min) |
|---|---|---|---|
| Filtration Fiber Dies: | | | |
| 1. Inner Zone | 500 | 69 | 22.3 |
| 2. Middle Zone | 550 | 69 | 27.4 |
| 3. Outer Zone | 550 | 63 | 48.8 |
| Support Fiber Die | 440 | 43 | 53.8 |

Figure 6B:
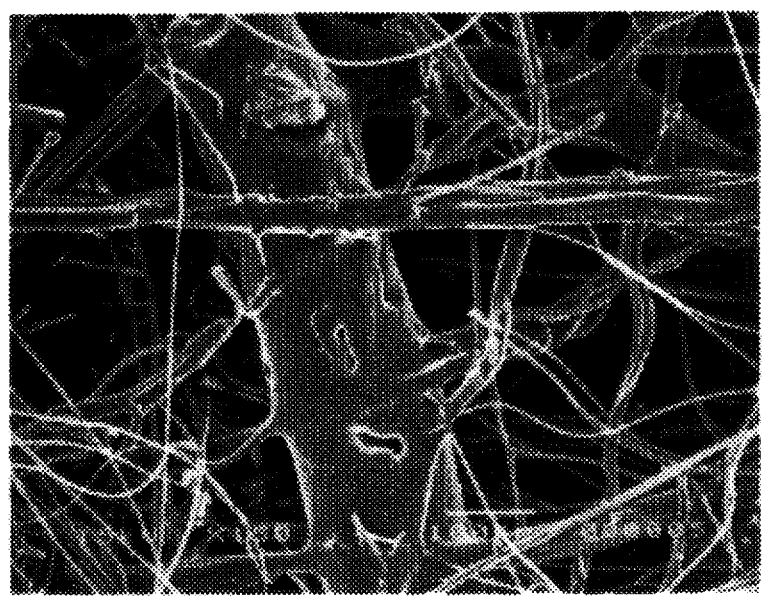
Figure 8A:
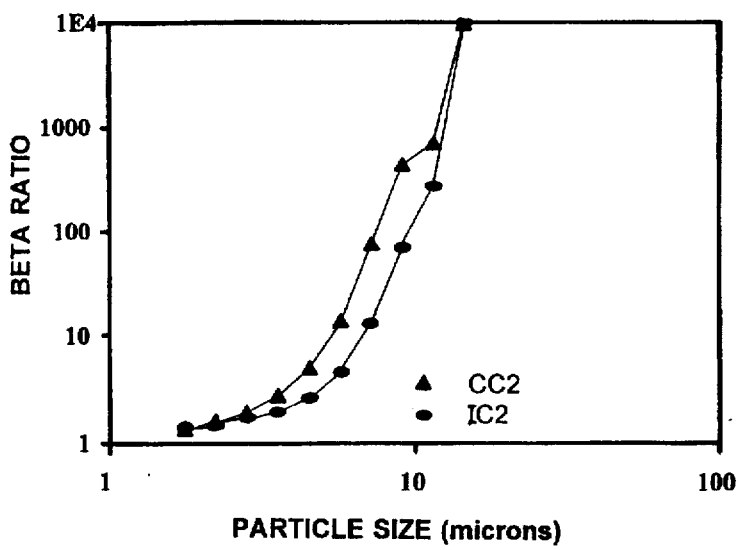
FIGS. 8A–8C are graphs corresponding respectively to the initial particle removal efficiency, plugging data and turbidimetric efficiency for the filter cartridges tested according to Example 2.
Figure 8B:
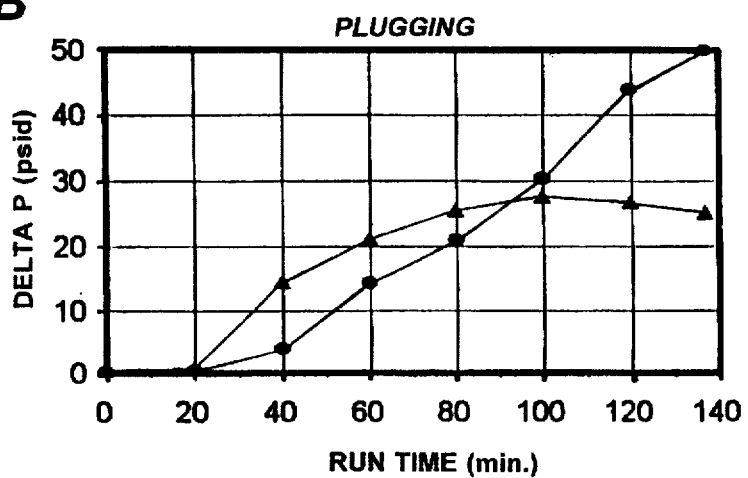
Figure 8C:
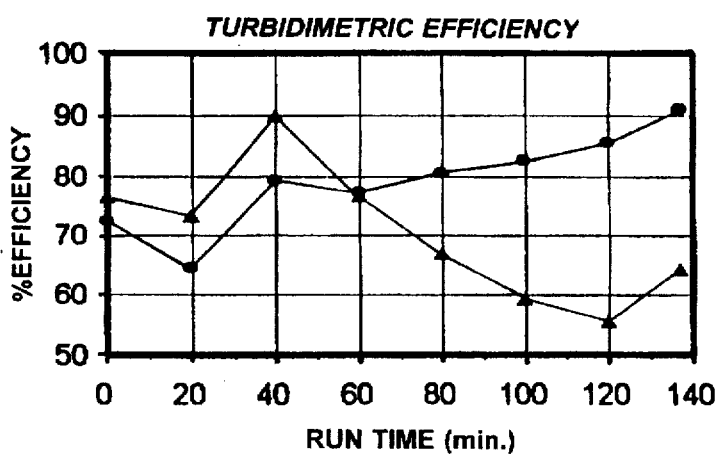

To evaluate the effect of the support fibers, a cartridge which was formed entirely of filtration fibers (Control Cartridge 2 designated "CC2")was fabricated under the above conditions. The two cartridges were then performance tested with the results appearing in the graphs of FIGS. 8A–8C, while a photomicrograph of the fibrous structure of IC2 is shown in FIG. 6B.

Example 3

Figure 6C:
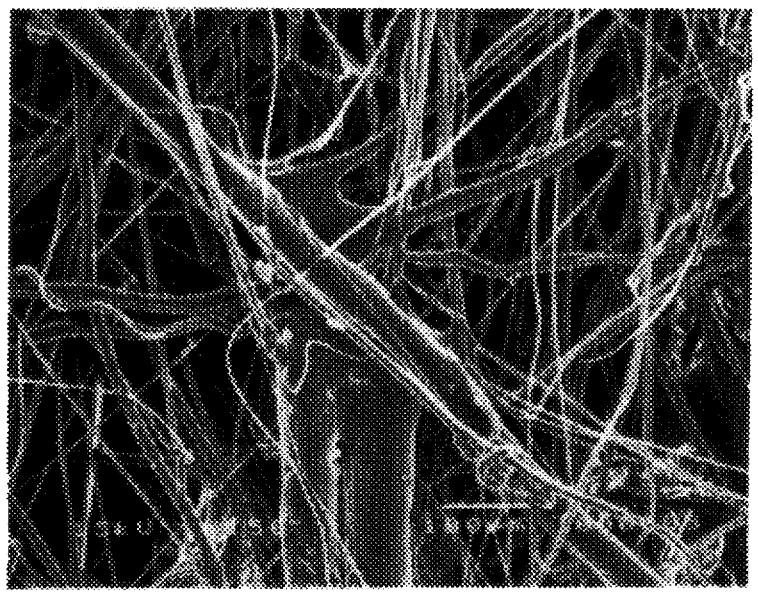
Figure 9A:
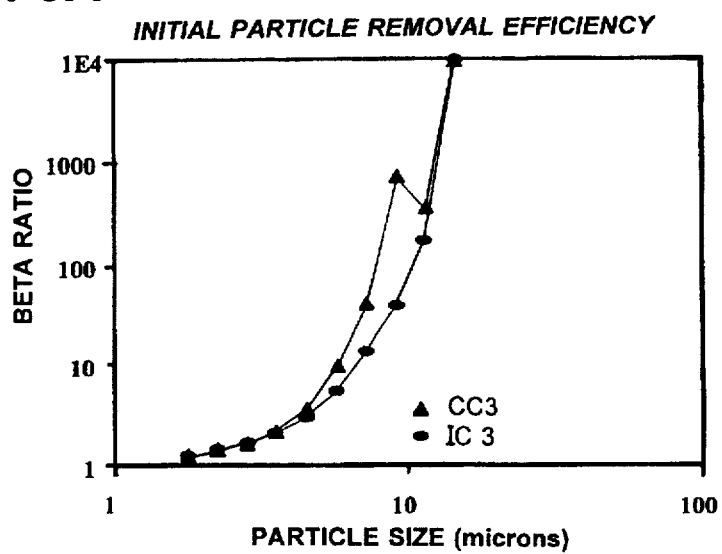
FIGS. 9A–9C are graphs corresponding respectively to the initial particle removal efficiency, plugging data and turbidimetric efficiency for the filter cartridges tested according to Example 3.
Figure 9B:
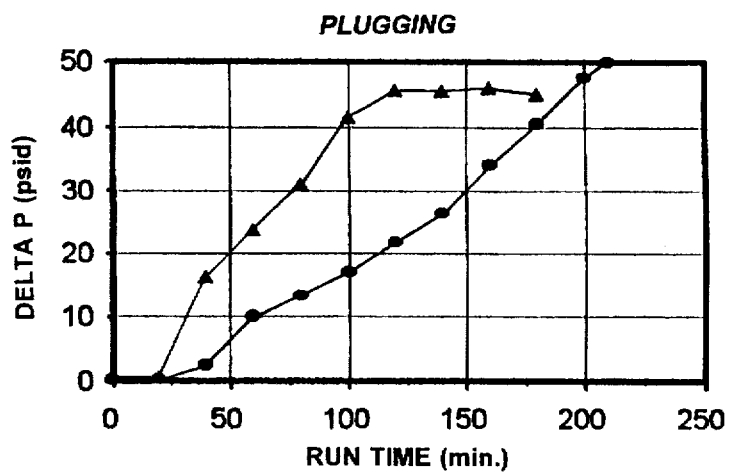
Figure 9C:
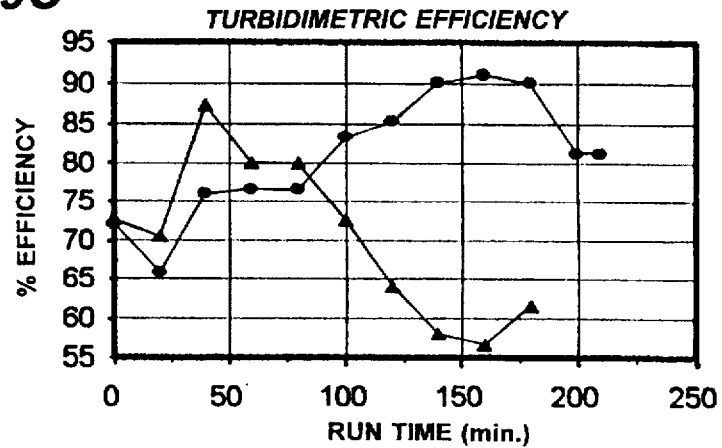

Example 2 was repeated except that the support fiber die polymer flow rate was reduced to 27.4 g/min., which reduced the support fiber content in the cartridge. The resulting cartridge (Invention Cartridge 3 designated "IC3") was performance tested against a cartridge that did not contain any support fibers, but containing filtration fibers produced under the same conditions (Control Cartridge 3 designated "CC3"). The results appear in the graphs of FIGS. 9A–9C, while a photomicrograph of the fibrous structure of IC3 is shown in FIG. 6C.

Example 4

The support fiber die for this Example 4 was positioned to collect fibers in the inner annular zone only by moving the support fiber die so that it was in line with the inner filtration fiber die. Based on dissection and analysis of the cartridge that was produced, a very small amount of support fibers appeared to have been collected in the middle zone. However, the proportion of the support fiber in the middle zone was believed to be less than in the previous examples. The support fiber polymer was a polypropylene material having a melt flow rate of 12 grams per 10 minutes. (Himont USA, Inc., Grade PD 626). A compressed air temperature of 500° F. was used. The process conditions at the dies were as follows:

| | Polymer Temp. (°F.) | Air Flow Rate (SCFM) | Polymer Flow Rate (g/min) |
|---|---|---|---|
| Filtration Fiber Dies: | | | |
| 1. Inner Zone | 500 | 69 | 16.6 |
| 2. Middle Zone | 550 | 78 | 22.3 |
| 3. Outer Zone | 550 | 69 | 43.0 |
| Support Fiber Die | 440 | 43 | 56.1 |

Figure 6D:
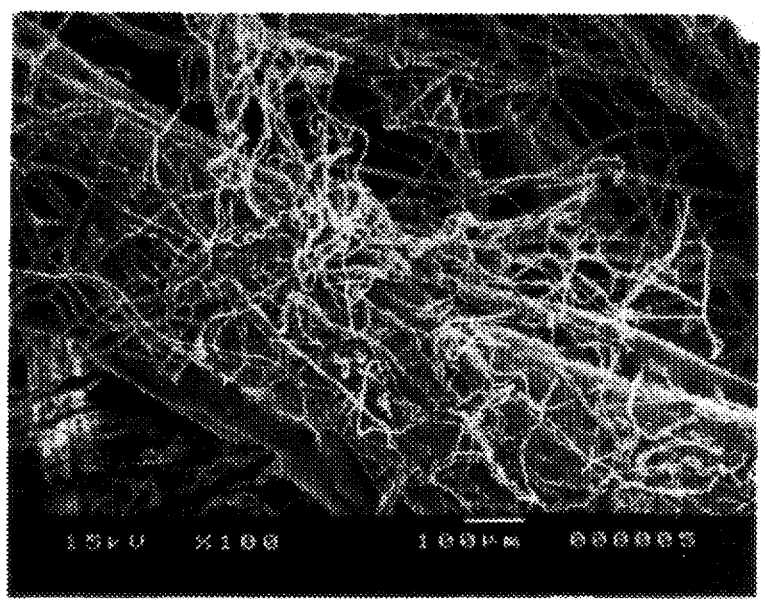
Figure 10A:
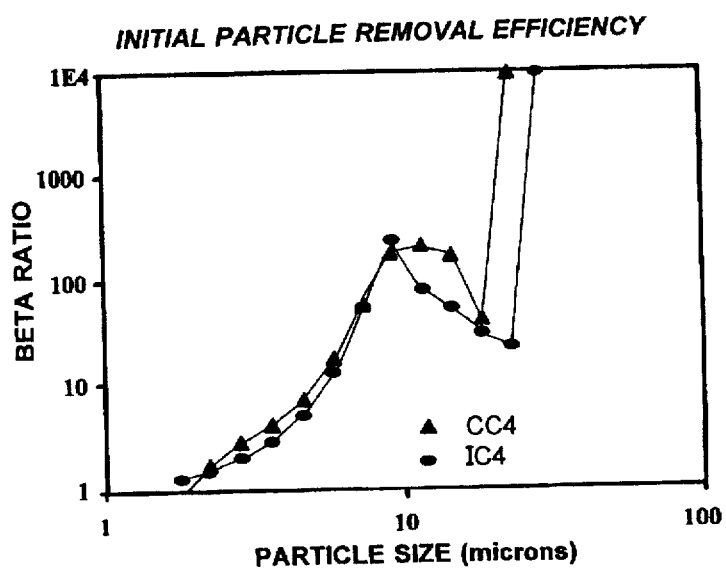
FIGS. 10A–10C are graphs corresponding respectively to initial particle removal efficiency, plugging data and turbidimetric efficiency for the filter cartridges tested according to Example 4.
Figure 10B:
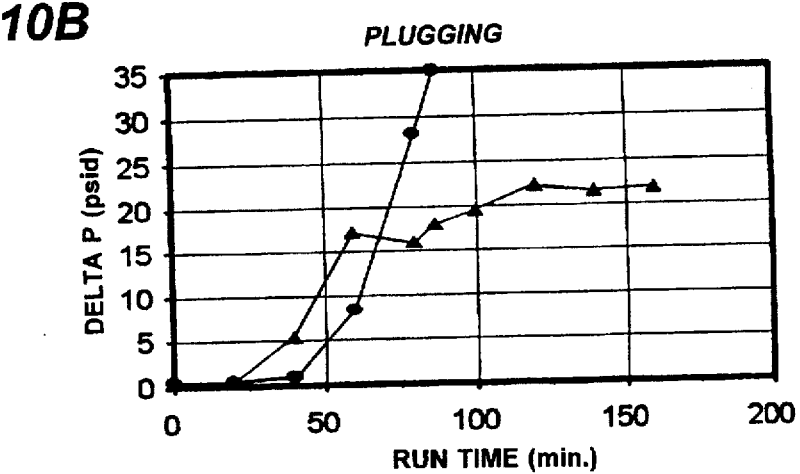
Figure 10C:
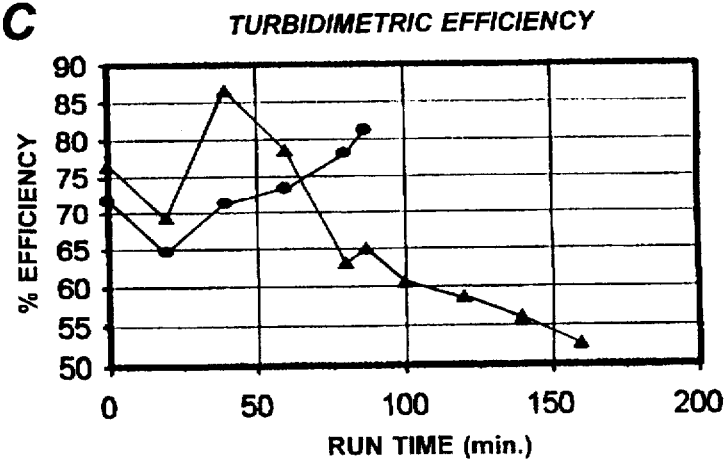

The resulting cartridge (Invention Cartridge 4 designated "IC4") was performance tested against a cartridge produced using the filtration die fiber conditions of Examples 2 and 3 above and containing no support fibers (Control Cartridge 4 designated "CC4"). The results appear in the graphs of FIGS. 10A–10C, while a photomicrograph of the fibrous structure of IC4 is shown in FIG. 6D.

Example 5

Figure 6E:
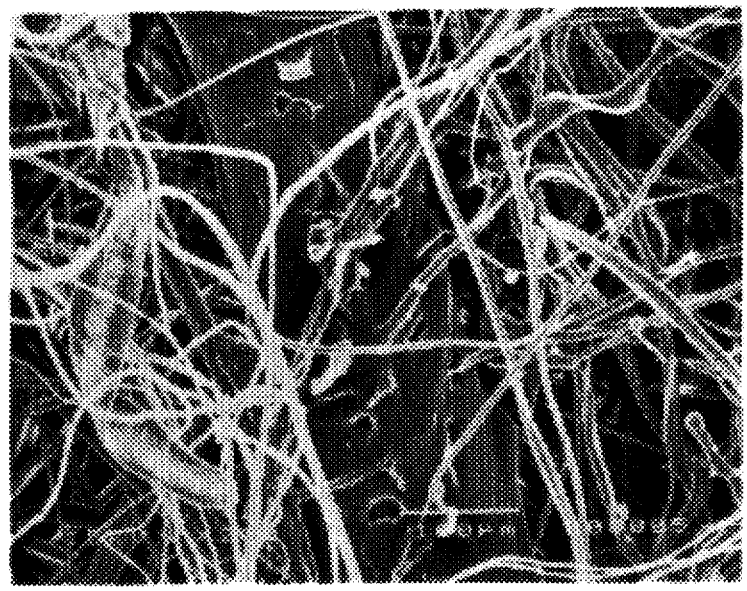
Figure 6F:
Figure 11A:
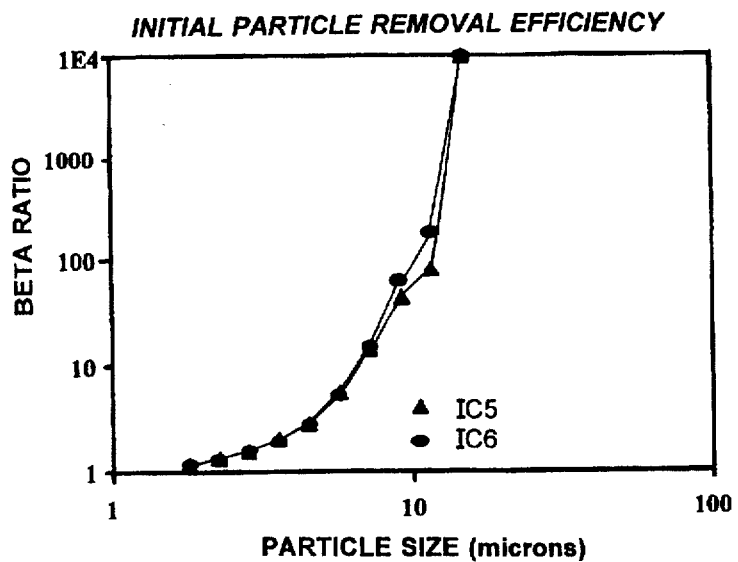
FIGS. 11A–11C are graphs corresponding respectively to initial particle removal efficiency, plugging data and turbidimetric efficiency for the filter cartridges tested according to Example 5.
Figure 11B:
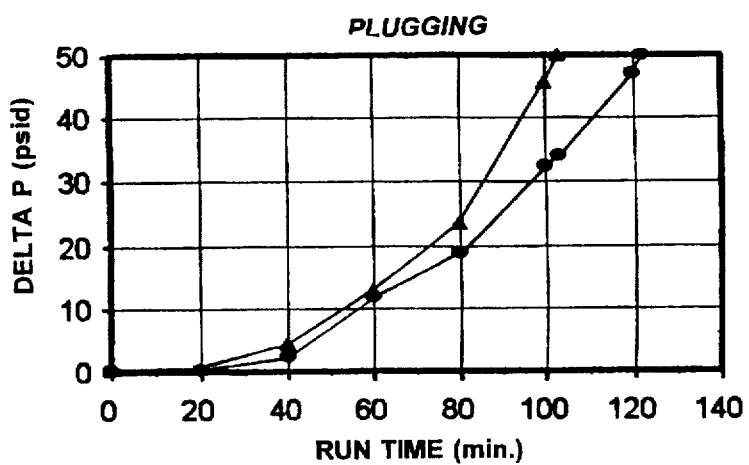
Figure 11C:
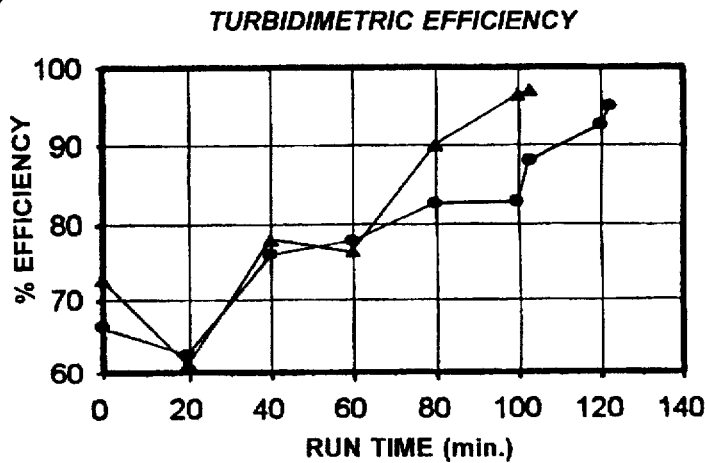

The process conditions of Example 2 were repeated except that the support fiber die polymer flow rate was increased to 95.4 g/min. thereby increasing the support fiber content. The resulting cartridge (Invention Cartridge 5 designated "IC5") was performance tested against another cartridge of the present invention which was produced according to Example 2 (Invention Cartridge 6 designated "IC6") so as to evaluate the effect of different support fiber contents. The results appear in the graphs of FIGS. 11A–11C, while photomicrographs of the fibrous structures of IC5 and IC6 are respectively shown in FIGS. 6E and 6F.

PHYSICAL DATA TABLE

| Cartridge | Filter Fiber Diameter (μm) | Support Fiber Diameter (μm) | Support Fiber Content (wt. %) | Support Fiber Location[1] | Mean Medium Void Volume | Air Permeability[2] | Cartridge Wt. (g) |
|---|---|---|---|---|---|---|---|
| IC1 | 6 | 59 | 44 | All | 83 | .39 | 123 |
| IC2 | 8 | 104 | 35 | I & M | 78 | .57 | 147 |
| IC3 | 9 | 71 | 21 | " | 81 | .64 | 125 |
| IC4 | 5 | >200 | 41 | " | 81 | .61 | 124 |
| IC5 | 8 | 96 | 49 | " | 73 | .77 | 173 |
| IC6 | 8 | 83 | 35 | " | 78 | .64 | 145 |

Notes:
[1]Location identifies the annular zones of the cartridge in which the support fibers are present, i.e., All = All Zones, I = Inner Zone and M = Middle Zone
[2]Data expressed in units of inch $H_2O$ @ 2 SCFM The performance test results of Examples 1–4 above demonstrate that the cartridges of the present invention exhibit improved long term filtration performance compared to filter cartridges that do not include integrally co-located support and filtration fibers. Although the inclusion of support fibers results in slightly less initial particle removal efficiency, the removal efficiency of the invention cartridges improves as the pressure differential increases over time as shown by the turbidimetric efficiency and plugging data. The gradual increase in differential pressure is a result of particles accumulating on the surface and within the depth of the filter media. As more and more particles are removed by the filter, its efficiency increases.

The control cartridges also exhibit increased efficiency with increasing differential pressure, but only to a point. The data indicate that the control cartridges reach a point of differential pressure where the efficiency peaks and thereafter exhibits a downward trend. This decrease in efficiency is believed to be the result of deformation of the filter media which causes the release of retained particles and/or a cartridge bypass due to separation of the cartridge from the filter housing seal.

In each of the Examples 1–4, the particle removal efficiency of the invention cartridge eventually surpassed that of the control cartridge and continued to increase until termination of the test. The improved long term efficiency of the invention cartridges is believed to result from improved strength provided by the support fibers. The support fibers appear to be effective in preserving the structural integrity of the filter medium under increasing differential pressure to the extent that retained contaminate is not released from the cartridge and/or a bypass condition does not develop. As a result, the time period during which the filter cartridge continues to effectively remove and retain particles from the fluid stream is extended. These advantages thereby translate into improved operating performance and reduced operating costs for filter cartridge users.

The test results of Example 5 show that similar performance results are achieved with different support fiber contents.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Filtration medium comprised of a mass of nonwoven melt blown continuous support and filtration fibers, said support fibers having on average a relatively larger diameter as compared to the diameter of said filtration fibers, wherein said relatively larger diameter support fibers define a random matrix of open areas, and wherein said filtration fibers are integrally co-located with said relatively larger diameter support fibers so as to be disposed physically within said random matrix of open areas defined by said support fibers.

2. Filtration medium comprised of a mass of nonwoven melt blown fibers including continuous support fibers having a mean diameter of between about 60 μm to about 500 μm which define a random matrix of open areas, and continuous filtration fibers having a mean diameter of between about 1 μm to about 50 μm which are integrally co-located with said relatively larger diameter support fibers so as to be disposed physically within said random matrix of open areas defined thereby.

3. Filtration medium as in claim 1 or 2, wherein at least some of said support and filtration fibers are unitarily fused one to another.

4. Filtration medium as in claim 1 or 2, wherein said support and filtration fibers are formed of the same or different polymer.

5. Filtration medium as in claim 4, wherein said support and/or said filtration fibers are formed of a polymer which is selected from the group consisting of polyolefins, polyamides, polyesters, acetals, fluoropolymers, polyphenylene sulfides, biodegradable polymers, liquid crystal polymers, polyetheretherketones, polystyrenes, polymers of vinylidene monomers, and mixtures thereof.

6. Filtration medium as in claim 1 or 2, wherein said support fibers comprise between about 10 to about 60 wt. % of said filtration medium.

7. A fluid filter which includes a filtration medium comprised of a mass of nonwoven melt blown continuous support and filtration fibers, said support fibers having on average a relatively larger diameter as compared to the diameter of said filtration fibers, wherein said relatively larger diameter support fibers define a random matrix of open areas, and wherein said filtration fibers are integrally co-located with said relatively larger diameter support fibers so as to be disposed physically within said random matrix of open areas defined by said support fibers.

8. A fluid filter which includes a filtration medium comprised of a mass of nonwoven melt blown fibers including continuous support fibers having a mean diameter of between about 60 μm to about 500 μm which define a random matrix of open areas, and continuous filtration fibers having a mean diameter of between about 1 μm to about 50 μm which are integrally co-located with said relatively larger diameter support fibers so as to be disposed physically within said random matrix of open areas defined thereby.

9. A fluid filter as in claim 7 or 8, wherein at least some of said support and filtration fibers are unitarily fused one to another.

10. A fluid filter as in claim 7 or 8, wherein said support and filtration fibers are formed of the same or different polymer.

11. A fluid filter as in claim 7 or 8, wherein said support and/or said filtration fibers are formed of a polymer which is selected from the group consisting of polyolefins, polyamides, polyesters, acetals, fluoropolymers, polyphenylene sulfides, biodegradable polymers, liquid crystal polymers, polyetheretherketones, polystyrenes, polymers of vinylidene monomers, and mixtures thereof.

12. A fluid filter as in claim 7 or 8, wherein said support fibers comprise between about 10 to about 60 wt. % of said filtration medium.

13. A fluid filter as in claim 7 or 8, which is comprised of a plurality of filtration zones, and wherein said filtration medium is included in at least one of said filtration zones.

14. A filtration medium having at least one filtration zone including continuous support fibers, and continuous filtration fibers which are co-located and intimately entangled with said support fibers, wherein said support fibers have a mean diameter of between about 60 μm to about 500 μm and define a random matrix of open areas, and wherein said filtration fibers have a mean diameter of between about 1 μm to about 50 μm.

15. Filtration medium as in claim 14, wherein said support fibers are present in an amount between about 10 to about 60 wt. % of said filtration medium.

16. Filtration medium as in claim 14, wherein at least some of said support and filtration fibers are unitarily fused one to another.

17. Filtration medium as in claim 14, which includes another filtration zone comprised of a mass of melt blown, nonwoven filtration fibers which exhibit a different filtration property as compared to the filtration fibers of said at least one filtration zone.

18. Filtration medium as in claim 17, wherein said another filtration zone is also comprised of said support fibers.

19. Filtration medium as in claim 18, wherein said support fibers of said at least one and another filtration zones have different diameters as compared to one another.

20. Filtration medium as in claim 14, wherein said support and filtration fibers are formed of the same or different polymer.

21. Filtration medium as in claim 20, wherein said support and/or said filtration fibers are formed of a polymer which is selected from the group consisting of polyolefins, polyamides, polyesters, acetals, fluoropolymers, polyphenylene sulfides, biodegradable polymers, liquid crystal polymers, polyetherether ketones, polystyrenes, polymers of vinylidene monomers and mixtures thereof.

* * * * *